(12) United States Patent
Rodriguez et al.

(10) Patent No.: US 11,046,541 B2
(45) Date of Patent: *Jun. 29, 2021

(54) DISPENSER CARTRIDGE AND WIPER WITH CORD

(71) Applicant: Sandar Industries, Inc., Atlantic Beach, FL (US)

(72) Inventors: Peter Rodriguez, Atlantic Beach, FL (US); Jason Rodriguez, Atlantic Beach, FL (US); Dennis A. Dohogne, St. Johns, FL (US)

(73) Assignee: Sandar Industries, Inc., Atlantic Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/029,171

(22) Filed: Sep. 23, 2020

(65) Prior Publication Data

US 2021/0009375 A1 Jan. 14, 2021

Related U.S. Application Data

(63) Continuation-in-part of application No. 15/899,004, filed on Feb. 19, 2018, now Pat. No. 10,815,092.

(Continued)

(51) Int. Cl.
*B65H 35/07* (2006.01)
*B65H 37/02* (2006.01)

(Continued)

(52) U.S. Cl.
CPC ......... *B65H 19/262* (2013.01); *B65H 19/283* (2013.01); *B65H 35/008* (2013.01);
(Continued)

(58) Field of Classification Search
CPC ............ B65H 35/0026; B65H 35/0033; B65H 35/004; B65H 35/008; B65H 37/005;
(Continued)

(56) References Cited

U.S. PATENT DOCUMENTS 2,600,904 A 6/1952 Morgan
2,890,808 A 6/1959 Seror
(Continued)

FOREIGN PATENT DOCUMENTS

DE 3733841 A1 4/1989
DE 29501739 U1 3/1995
(Continued)

*Primary Examiner* — Mark A Osele
(74) *Attorney, Agent, or Firm* — Rogers Towers, P. A.; Joseph P. Kincart

(57) ABSTRACT

A dispenser housing for dispensing a multi-layer tape transfer tape used in a paper web turn-up operation, the transfer tape being the combination of a tape substrate coated on one side with a web grabbing adhesive and on the other side with a mounting adhesive and an affixed cord or cordlike feature, and a release liner having a release liner substrate fully coated on a first side with a release layer and zone-coated on a second side with a release layer, the transfer tape being wound onto a single spool with the release liner facing inward and the mounting side adhesive facing outward, such that buckling is precluded when the transfer tape is unwound from the spool.

20 Claims, 7 Drawing Sheets

Related U.S. Application Data

(60) Provisional application No. 62/510,448, filed on May 24, 2017.

(51) Int. Cl.
    *B65H 19/26*     (2006.01)
    *B65H 19/28*     (2006.01)
    *B65H 35/00*     (2006.01)
    *C09J 7/40*     (2018.01)
    *B65H 37/00*     (2006.01)

(52) U.S. Cl.
    CPC ....... *B65H 35/0033* (2013.01); *B65H 37/005* (2013.01); *C09J 7/403* (2018.01); *B65H 35/0026* (2013.01); *B65H 2701/1722* (2013.01); *B65H 2701/1727* (2013.01); *B65H 2701/17262* (2013.01); *B65H 2701/194* (2013.01)

(58) Field of Classification Search
    CPC ........... B65H 2701/17224; B65H 2701/17262; B65H 2701/1727
    See application file for complete search history.

(56) References Cited

U.S. PATENT DOCUMENTS

| | | | |
|---|---|---|---|
| 2,927,710 | A | 3/1960 | Raber |
| 3,542,587 | A | 11/1970 | Aronoff et al. |
| 3,890,191 | A | 6/1975 | Mayer |
| 5,453,141 | A * | 9/1995 | Rodriguez ........... B65H 19/267 156/184 |
| 5,851,348 | A | 12/1998 | Muenzer et al. |
| 9,539,797 | B2 | 1/2017 | Heinemann |
| 10,815,092 | B2 * | 10/2020 | Rodriguez ........... B65H 35/008 |
| 2003/0113499 | A1 | 6/2003 | Sieber et al. |
| 2005/0133654 | A1 | 6/2005 | Metzger |
| 2006/0180700 | A1 | 8/2006 | Wambaugh et al. |
| 2015/0368517 | A1 | 12/2015 | Yasuzawa |
| 2018/0339828 | A1 | 11/2018 | Lin |

FOREIGN PATENT DOCUMENTS

| | | |
|---|---|---|
| DE | 102006018499 A1 | 8/2007 |
| WO | 2007041599 A1 | 4/2007 |

\* cited by examiner

DISPENSER CARTRIDGE AND WIPER WITH CORD

CROSS-REFERENCE TO RELATED APPLICATIONS

This application claims priority to the Non-Provisional patent application Ser. No. 15/899,004 filed Feb. 19, 2018 and entitled Dispenser Cartridge And Wiper, as a continuation in part application, which in turn claims the benefit of the Provisional Patent Application Ser. No. 62/510,448 filed May 24, 2017 and entitled Dispenser Apparatus and Method of Use, In Particular for Laminating and Dispensing Transfer Tape in a Paper Web Turn-Up System, the contents of each of which are incorporated herein by reference in their entirety.

BACKGROUND OF THE INVENTION

This invention relates generally in a first sense to the field of devices, apparatuses and methods of effecting the high-speed severing and transfer of a rapidly advancing paper web from a rotating full web spool onto an empty web spool, and more particularly where such an operation is performed utilizing a transfer or double-sided adhesive turn-up tape. More particularly, the invention relates to an apparatus and method for dispensing transfer tape and its use in a paper web severing/transfer method, wherein the transfer tape is the affecting means for severing, transferring and securing the paper web from a rotating full web spool onto an empty web spool. Additionally, the invention relates in general to a tape dispensing apparatus that dispenses a multi-layer tape useful in various industrial applications.

Modern paper manufacturing is typically performed by producing continuous lengths of paper having widths of over 400 inches in some cases, referred to as paper webs, which are wound onto web spools for subsequent converting, storage, transfer or the like. The winding or spooling operation for the paper web, such as in the case of tissue grades, occurs at high speeds, in some cases exceeding 6000 feet per minute, and in order to maximize production by minimizing downtime and waste it is desirable to sever and simultaneously transfer the moving paper web from a full web spool onto an empty web spool without stopping, adjusting draws (i.e. the speed differential between the incoming and outgoing web rotating support members that are not driven by a common source) or slowing the movement of the web. Methods and apparatuses for accomplishing this severing and transfer utilizing what is known as a transfer or turn-up tape have long been known. An early example of such a system is shown in U.S. Pat. No. 2,461,246 to Weyenberg, issued in 1949. Other examples are shown in our U.S. Pat. Nos. 4,659,029, 4,757,950, 4,783,018, 5,046,675, 5,453,141, 5,637,170, and 5,954,290. Further examples and detailed discussion of such equipment, systems and methodologies are present in our U.S. Pat. Nos. 4,659,029, 4,757,950, 4,783,018, 5,046,675, 5,417,383, 5,453,141, 5,637,170, 5,954,290, 6,467,719, 6,578,788, 7,875,152, 8,124,209, 8,178,181 and 8,580,062, the disclosures of which are incorporated herein by reference.

The transfer tape utilized in severing and transferring the paper web comprises a substrate having a first adhesive side, the spool mounting side, preferably comprised of a pressure sensitive adhesive (PSA), adapted to contact and adhere to the longitudinal cylindrical surface of the empty web spool. The opposite side of the transfer tape substrate, the web-side (or web grabbing side), has a second adhesive side adapted to contact and adhere to the moving paper web when the rotating empty web spool is brought into contact with the paper web. With the adhesion of the paper web to the empty web spool through this transfer tape, the web is severed from the full web spool and its new leading edge, formed at the severing line created by the transfer tape, adheres to the rotating empty web spool, thus completing the transfer.

This invention is of particular application to transfer tapes of the type having a cover flap extending over the web-side adhesive on the substrate of the transfer tape, the cover flap being longitudinally adhered along one edge of the transfer tape, wherein the cover flap is provided with a release coating, such as a silicone layer, over the majority of the side of the cover flap facing the adhesive side. With this construction, the cover flap remains closed to protect the web-side adhesive from contaminants such as dust and debris until the empty web spool is spun up to its speed to match the speed of the web. As the empty web spool rotates the cover flap peels back due to aerodynamic effects, pulling the release-coated section of the flap away from the adhesive. The cover flap opens at its leading edge, which is the edge of the transfer tape first encountering the resulting airstream due to the rotation of the empty web spool. The cover flap remains attached to the web-side adhesive at the trailing edge of the transfer tape due to the flap being void of the silicone release layer in that narrow region. The transfer tape is now in a state with its protective cover flap peeled back to expose the fresh and uncontaminated adhesive and is able to adhere to the subject paper web to sever and transfer it to the empty web spool. Examples of such transfer tapes are shown in U.S. Pat. Nos. 8,124,209 and 8,178,181.

The high-speed transfer of lightweight paper webs, such as groundwood papers (including, for example, newsprint) or tissue paper, is more difficult to accomplish due to the weaker structure of the paper. In addition, in systems using adhesive transfer tapes for the web transfer, the exposed adhesive side of the transfer tape is often contaminated with airborne dust, floating paper fibers and other debris, which are prevalent with the lightweight paper webs, such that the adhesion is weakened or even substantially blinded, which can result in a failed transfer. A failed transfer results in lost production, inconsistent winding of the product and inconsistent roll sizes, excessive waste, shorter service life of the fiber cores which are commonly used in tissue making machines, and unsafe operating conditions.

Thicker transfer tape substrates are preferable as the thicker tape makes more complete contact with rotating web spools having fiber cores, as the core surfaces of the empty web spool are not always concentric to its spinning axis, possibly resulting in relatively large gaps when the empty core is brought into contact with the web. Voids and gaps may also be present in the fiber cores themselves, and thicker substrates are better at filling the gaps to present the adhesive to the moving web.

SUMMARY OF THE INVENTION

Accordingly, it is an object of this invention to provide an apparatus and method addressing the contamination problem of the exposed adhesive on the transfer tape. It is a further object to provide such an apparatus and method that allows for the transfer tape to be dispensed in the desired length as needed for performing the turn-up operation. It is a further object to provide an apparatus and method adapted for use in many different industrial applications.

It is also an object of this disclosure to provide embodiments of transfer tape design comprising a cord or filament that is included into the structure of the transfer tape and provides support and stiffening of the transfer tape. In some preferred embodiments, the transfer tape may include a cord that contains material suitable to be re-pulped and included in the paper product. The suitability to be re-pulped may significantly reduce waste in paper processing.

The apparatus comprises a dispenser housing for dispensing a multi-layer tape, and in particular a paper web transfer tape, the housing containing a transfer tape spool. The transfer tape is a laminated composite of a zone-coated release liner and a transfer tape base or substrate, the transfer tape substrate having a pressure sensitive adhesive (PSA) on both sides. The release liner is comprised of a paper substrate with a release coating on both sides. The release coating on the side facing the PSA does not cover the entire surface, such that a longitudinally extending strip of the release liner substrate paper along one edge is free of the release coating so as to define a cover flap. With this construction, the cover flap is effectively hinged to the PSA transfer tape substrate. The uncoated zone provides a strong adhesion of the cover flap to the PSA. This adhesion zone retains the cover flap to the PSA even when the cover flap opens to expose the PSA for the turn-up operation. It is important that the cover flap remain attached to the PSA during the time it is open. If the cover flap were to detach from the PSA the loose cover flap could become entangled in the high-speed equipment, interfering with its proper operation, or it could interfere with the fragile paper web, causing it to rupture.

The dispenser cartridge is an enclosure which prevents dust and other particulates from contacting the components, especially any exposed PSA, while the laminated transfer tape is awaiting use for application to the empty web spool. The cartridge dispenses the transfer tape outside of the enclosure through a small slot. The dispenser cartridge preferably contains a wiper blade, preferably made of a semi-rigid, flexible but resilient, material, to wipe or press the transfer tape onto the empty web spool. This is valuable since the transfer tape is relatively wide and the empty web spool presents a cylindrical surface. The wiper blade presses on the release liner/cover flap of the transfer tape, that is the web-grabbing side of the tape, and flexes as necessary to conform the transfer tape to the curved surface of the web spool. In this way the wiper blade helps to assure a uniform adhesion of the PSA of the transfer tape to the empty web spool. The dispenser cartridge may be a stand-alone assembly such that the operator manipulates the dispenser cartridge along the empty web spool by hand, or the dispenser cartridge may be adapted for use within a secondary housing, or for use in dispensing equipment or apparatus, whether fixed, moving or handheld. The dispenser cartridge may be designed, structured and adapted to be a replaceable assembly removed from a secondary external unit, equipment or the like when empty, with a full cartridge then inserted in its place.

The orientation of the transfer tape as wound onto the transfer tape spool is critical to prevent undesirable buckling of the release liner relative to the PSA-coated base. The PSA layer is relatively thicker and more elastic in comparison to the release liner, which is formed of a paper-based material. While the release liner is flexible enough to be wound around the transfer tape spool, it will not stretch or compress as much as the PSA layer. If the transfer tape is wound onto the tape spool with the PSA-coated substrate on the inside and the release liner on the outside, which is the typical orientation, when a segment of transfer tape is unrolled and flattened as it is applied to the empty web spool the release liner buckles due to the differential in length of the release liner relative to the PSA-coated substrate. To address this problem, the transfer tape is wound onto the transfer tape spool with the PSA-coated substrate on the outside and the release liner on the inside. When unrolled and applied to the surface of the empty web spool, the release liner is shorter than the PSA layer and will be pulled tight, thereby eliminating the buckling problem. Thus, the apparatus provides for the application of transfer tape in optimal condition in the required length as needed for the web turn-up transfer operation.

Alternatively, the invention may be summarized and described as a transfer tape cartridge dispenser comprising transfer tape with an incorporated cord feature wound onto a transfer tape spool within a housing, said housing having a slot adapted such that said transfer tape passes through said slot as it is unwound; said transfer tape adapted to sever and secure a paper web from a first web spool onto an empty web spool in a web turn-up operation, said transfer tape comprising a tape substrate coated on one side with a web grabbing adhesive and on the other side with a mounting adhesive, and a release liner having a release liner substrate fully coated on a first side with a release layer and zone-coated on a second side with a release layer, said release layer being of a material that prevents adhesion of the adhesive to the release liner substrate; said zone-coated release layer defining a longitudinally extending uncoated joining region on said release liner substrate, whereby said web grabbing adhesive adheres to the said uncoated joining region of said release liner substrate such that said zone-coated release layer defines a cover flap not adhered to said web grabbing adhesive; said transfer tape being wound onto said transfer tape spool with said release liner facing inward and said mounting side adhesive facing outward, such that said release layer fully coated on said first side of said release liner substrate prevents adhesion of said mounting side adhesive to said release liner substrate. Furthermore, also provided is such a transfer tape cartridge dispenser, wherein said adhesive is a pressure sensitive adhesive; wherein said uncoated joining region of said release liner substrate extends along a longitudinal edge of said release liner substrate; further comprising a wiper mounted on said housing adjacent said slot, said wiper adapted to apply pressure to said transfer tape when said transfer tape is applied to said empty web spool; wherein said wiper is permanently mounted onto said housing; wherein said wiper is removably mounted onto said housing such that said wiper is reusable with other said dispenser cartridges; wherein said web grabbing adhesive is thicker than said release liner; wherein said web grabbing adhesive is more elastic than said release liner; and/or wherein said web grabbing adhesive is more compressible than said release liner.

Alternatively still, the invention may be summarized and described as a transfer tape cartridge dispenser comprising transfer tape with an incorporated cord feature adapted to sever and secure a paper web from a first web spool onto an empty web spool in a web turn-up operation, said transfer tape wound onto a transfer tape spool within a housing, said housing having a slot adapted such that said transfer tape passes through said slot as it is unwound and a wiper mounted on said housing adjacent said slot, said wiper adapted to apply pressure to said transfer tape when said transfer tape is applied to said empty web spool; said transfer tape comprising a tape substrate coated on one side with a web grabbing pressure sensitive adhesive and on the other side with a mounting pressure sensitive adhesive, and a release liner having a release liner substrate fully coated on a first side with a release layer and zone-coated on a second side with a release layer, said release layer being of a material that prevents adhesion of the pressure sensitive adhesive to the release liner substrate; said zone-coated release layer defining a longitudinally extending uncoated joining region on a longitudinal edge of said release liner substrate, whereby said web grabbing adhesive adheres to the said uncoated joining region of said release liner substrate such that said zone-coated release layer defines a cover flap not adhered to said web grabbing pressure sensitive adhesive; wherein said web grabbing pressure sensitive adhesive is thicker, more elastic and more compressible than said release liner; said transfer tape being wound onto said transfer tape spool with said release liner facing inward and said mounting side pressure sensitive adhesive facing outward, such that said release layer fully coated on said first side of said release liner substrate prevents adhesion of said mounting side pressure sensitive adhesive to said release liner substrate.

Alternatively still again, the invention may be summarized and described as a method of dispensing and applying a transfer tape with an incorporated cord feature onto an empty web spool to sever and secure a paper web from a first web spool onto an empty web spool in a web turn-up operation comprising the steps of: winding said transfer tape onto a transfer tape spool within a dispenser cartridge housing and extending said transfer tape through a slot in said housing a slot adapted such that said transfer tape passes through said slot; said transfer tape comprising a tape substrate coated on one side with a web grabbing pressure sensitive adhesive and on the other side with a mounting pressure sensitive adhesive, and a release liner having a release liner substrate fully coated on a first side with a release layer and zone-coated on a second side with a release layer, said release layer being of a material that prevents adhesion of the pressure sensitive adhesive to the release liner substrate; said zone-coated release layer defining a longitudinally extending uncoated joining region on a longitudinal edge of said release liner substrate, whereby said web grabbing adhesive adheres to the said uncoated joining region of said release liner substrate such that said zone-coated release layer defines a cover flap not adhered to said web grabbing pressure sensitive adhesive; wherein said step of winding said transfer tape onto said transfer tape spool comprises winding said transfer tape onto said transfer tape spool with said release liner facing inward and said mounting side pressure sensitive adhesive facing outward, such that said release layer fully coated on said first side of said release liner substrate prevents adhesion of said mounting side pressure sensitive adhesive to said release liner substrate. Furthermore, the method further comprising the step of passing a segment of said transfer tape through said slot and applying said transfer tape to said empty web spool, pressing said transfer tape onto said empty web spool using a wiper, and cutting said segment of transfer tape; and/or wherein said step of applying said transfer tape to said empty web spool comprises orienting said transfer tape on said empty web spool such that said cover flap extends in the direction of rotation of said empty web spool.

Alternatively, a transfer tape may be formed by assembling a tape substrate coated on one side with a web grabbing adhesive and on the other side with a mounting adhesive and a release liner having a release liner substrate fully coated on a first side with a release layer and zone-coated on a second side with a release layer, said release layer being of a material that prevents adhesion of the adhesive to the release liner substrate, and a cord affixed to the tape substrate. In some examples, the cord may be adhered to the mounting adhesive. In other examples, the cord may be adhered, potentially with a pressure sensitive coating, to the web grabbing adhesive. In some examples, the zone-coated release layer may define a longitudinally extending uncoated joining region on said release liner substrate. The web grabbing adhesive may adhere to the said uncoated joining region of the release liner substrate such that said zone-coated release layer defines a cover flap not adhered to the web grabbing adhesive. In some examples, the cord may define an elevated surface profile of the transfer tape proximate to the cord when the transfer tape is adhered to a surface.

DETAILED DESCRIPTION OF THE INVENTION

With reference to the drawings, which are provided for descriptive and illustrative purposes are which are not meant to be limiting as the scope of the invention, the invention in various embodiments in a broad and general sense is an apparatus and a method for dispensing a multi-layer adhesive tape, and in particular a transfer tape used in a paper web turn-up operation, wherein a continuous paper web being rolled onto a first web spool is severed and transferred to an empty second web spool when the first web spool is fully wound, the transfer occurring without requiring the flow of the paper web to be temporarily altered or stopped. It is to be understood that disclosure of the apparatus and method in relation to a paper web turn-up operation is an exemplary disclosure not meant to be limiting, as the dispenser structure as described is suitable for the production of different types of tapes for different industrial applications. It is to be understood that the dispenser cartridge may be a stand-alone assembly such that the operator manipulates the dispenser cartridge along the empty web spool by hand, or the dispenser cartridge may be adapted for use within a secondary housing, for use in dispensing equipment, whether stationary or mobile, etc. The dispenser cartridge may be designed, structured and adapted to be a replaceable assembly removed from a secondary external unit, equipment or the like when empty with a full cartridge then inserted in its place.

Figure 1:
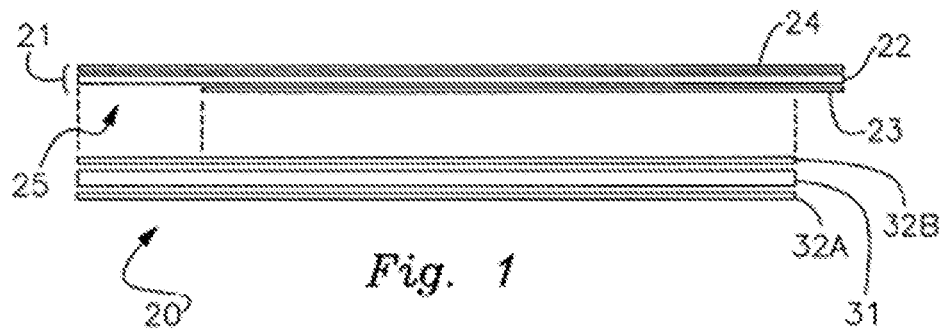
FIG. 1 is an exploded end view of an embodiment of the transfer tape.
Figure 2:
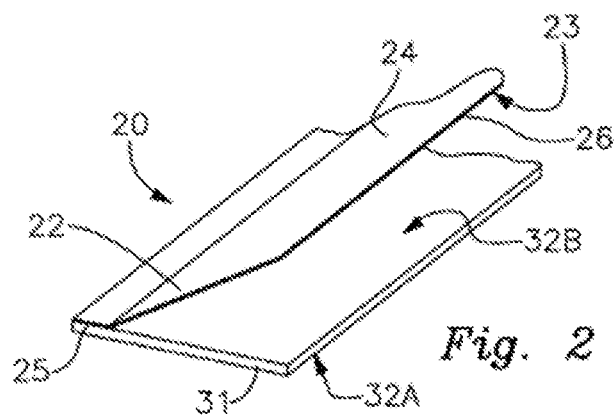
FIG. 2 is a perspective illustration of the embodiment of FIG. 1 shown with the transfer tape assembled and with the cover flap partially open.

The transfer tape 20, an embodiment of which is shown in FIGS. 1 and 2, is a laminated composite of a transfer tape base or substrate 31 and a zone-coated release liner member 21. The transfer tape substrate 31 is composed of a paper stock member (or a member composed of similar, suitable material, most preferably re-pulpable) of sufficient strength, thickness, texture and stiffness to accomplish the turn-up transfer operation without breaking or separating throughout its subsequent use. Both sides of the transfer tape substrate 31 are coated, layered or laminated with an adhesive, preferably a pressure sensitive adhesive (PSA), suitable for attaching one side (the mounting side) of the laminated transfer tape 20 to an empty paper web spool and the other side (the web side) to a paper web of tissue or the like. The PSA 32A on the mounting side may have different properties compared to the PSA 32B on the web grabbing side. These different properties may include adhesion, tackiness, color, or thickness, among others.

The release liner member 21 comprises a release liner substrate 22, preferably composed of a re-pulpable material, that is fully coated on its exposed side with a release layer or coating 24 composed of a material, such as silicone, that has very low adhesion to the PSA 32. With this coating, the mounting side PSA 32A will not adhere to the release liner substrate 22 when the transfer tape 20 is wound onto the transfer tape spool 12 of the dispenser cartridge 10, as the winding places the mounting side PSA 32A in contact with the release layer or coating 24. The opposite or interior side of the release liner substrate 22 is zone-coated with a suitably chosen release layer or coating 23 that prevents adhesion of the web grabbing PSA 32B to the release liner substrate 22. This non-adhering portion of the release liner substrate 22 defines the cover flap 26 which temporarily covers and then opens to expose the web grabbing PSA 32B during the turn-up operation as explained.

The zone-coated release layer 23 only covers a majority of the interior side of the release liner substrate 22, such that a longitudinal strip or zone along or near one longitudinal edge of the release liner substrate 22 is left uncoated and defines a longitudinally extending uncoated joining region 25. When the two components are laminated together to form the transfer tape 20, the region of the web grabbing side release liner 21 corresponding to the uncoated joining region 25 adheres the release liner substrate 22 to the transfer tape substrate 31 along an edge (the trailing edge when in use), thus creating in effect a hinge and defining the cover flap 26 that is free to open.

In one embodiment of the transfer tape 20 the release liner 21 is wider than the tape substrate 31, such that the cover flap 26 extends beyond the unattached edge of the tape substrate 31. When the transfer tape 20 is applied to the empty web spool this overhang is the leading edge of the tape 20, facing into the direction of rotation of the empty web spool when it is spun up for the turn-up operation. The overhang portion of cover flap 26 catches the air caused by the high-speed rotation of the empty web spool. This aerodynamic affect causes the cover flap 26 to peel back and expose the web grabbing side PSA 32B so as to adhere to and sever the web.

Figure 3:
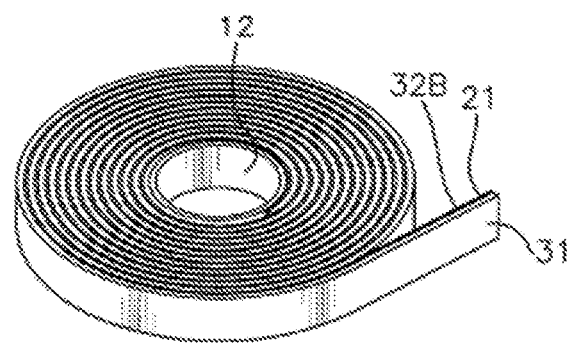
FIG. 3 illustrates a properly wound transfer tape having the tape substrate on the outside and the release liner on the inside to address buckling problems.

Rather than supplying short segments of transfer tape 20, it is much more economical and efficient to provide the transfer tape 20 as a wound roll which is then cut into the appropriate lengths when needed. The orientation of the transfer tape 20 as wound onto a transfer tape spool 12 is critical to prevent undesirable buckling of the release liner 21 relative to the PSA-coated tape substrate 31. The web grabbing side PSA layer 32B is relatively thicker, more elastic and more compressible in comparison to the release liner 21. While the release liner 21 is flexible enough to be wound around the transfer tape spool 12, it will not stretch or compress as much as the web grabbing side PSA layer 32B. If the transfer tape 20 is wound onto the tape spool 12 with the PSA-coated tape substrate 31 on the inside and the release liner 21 on the outside, which is the typical orientation, when a segment of transfer tape 20 is unrolled and flattened as it is applied to the empty web spool the release liner 21 buckles due to the differential in length and elasticity of the release liner 21 relative to the web grabbing side PSA layer 32B. This buckling may interfere with the proper opening of the cover flap 26. To solve this problem, the transfer tape 20 is wound onto the transfer tape spool 12 with the PSA-coated substrate 31 on the outside and the release liner 21 on the inside, as shown in FIG. 3. When unrolled and applied to the surface of the empty web spool, the release liner 21 is shorter than the web grabbing side PSA layer 32B and will be pulled tight, thereby eliminating the buckling problem.

To maintain the pre-wound transfer tape 20 in a clean state, the roll of transfer tape 20 and tape spool 12 are contained within a dispensing cartridge. In a basic version, the dispenser cartridge comprises a housing 11 or enclosure having a top panel, a bottom panel and four side panels, although it is not essential that the housing 11 be rectangular. The housing 11 is constructed such that it is substantially sealed in the sense that dust and particulates are prevented from entering the housing 11 to contaminate the transfer tape 20. The transfer tape 20 is then dispensed through a slot 13 in the dispenser cartridge housing 11. The laminated transfer tape 20 is caused to move through the dispensing cartridge 10 by any of several methods, including manually pulling the tape 20 from the dispenser cartridge 10. The dispensing cartridge also comprises a semi-rigid wiper 14 to properly contour and uniformly adhere the mounting side PSA 32A to the empty web spool. The wiper 14 may be a component manufactured into the dispensing cartridge 10 or may be a component that is subsequently attached to the dispensing cartridge by the operator. A cutter adjacent the slot (not shown) may be provided to sever the desired length of transfer tape 20. The cutter may also be a device to perforate the transfer tape 20 for manual separation by the operator, or the cutter may be a separate device such as a scissors. The length of product to be dispensed is determined by the operator.

The dispensed transfer tape 20 is applied to the empty web spool. The mounting side PSA 32A of the transfer tape 20 is oriented toward the longitudinal surface of the empty web spool and the web-grabbing PSA side 32B or cover flap 26 of the transfer tape 20 is oriented facing outward, away from the empty web spool. The transfer tape 20 is oriented on the web spool such that the leading edge of the cover flap 26, which is the edge that will open, is facing into the airstream that will result when the empty web spool is rotated up to speed to match the line speed of the paper web. Conversely, the trailing edge of the transfer tape 20, which is the edge of the tape 20 where the cover flap 26 is hinged and retained, is facing away from the airstream of the rotating empty web spool.

Figure 4:
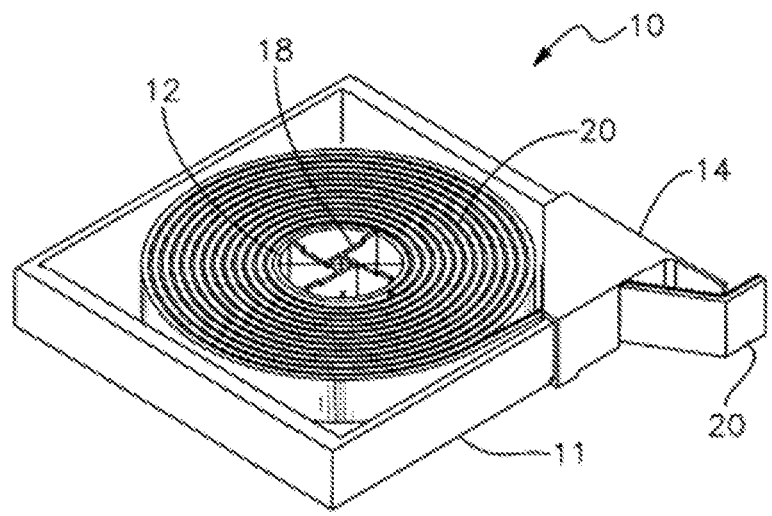
FIG. 4 is an exposed view of a first embodiment of the cartridge dispenser.
Figure 5:
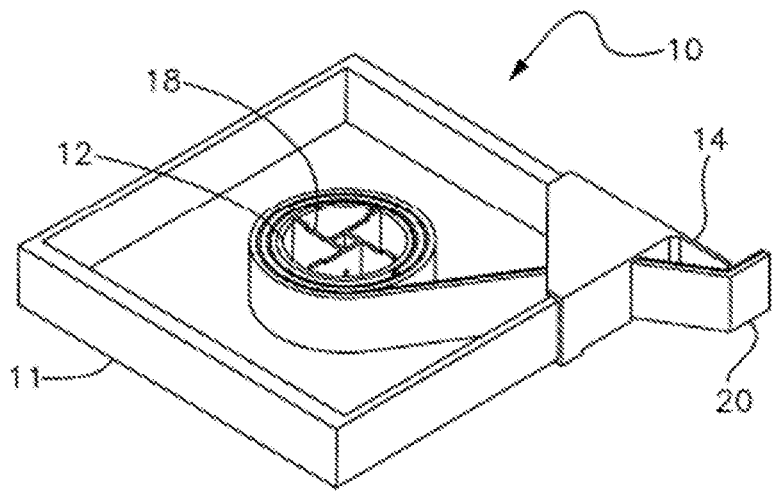
FIG. 5 is an exposed view of the cartridge dispenser of FIG. 4 where the transfer tape spool is now empty.
Figure 6:
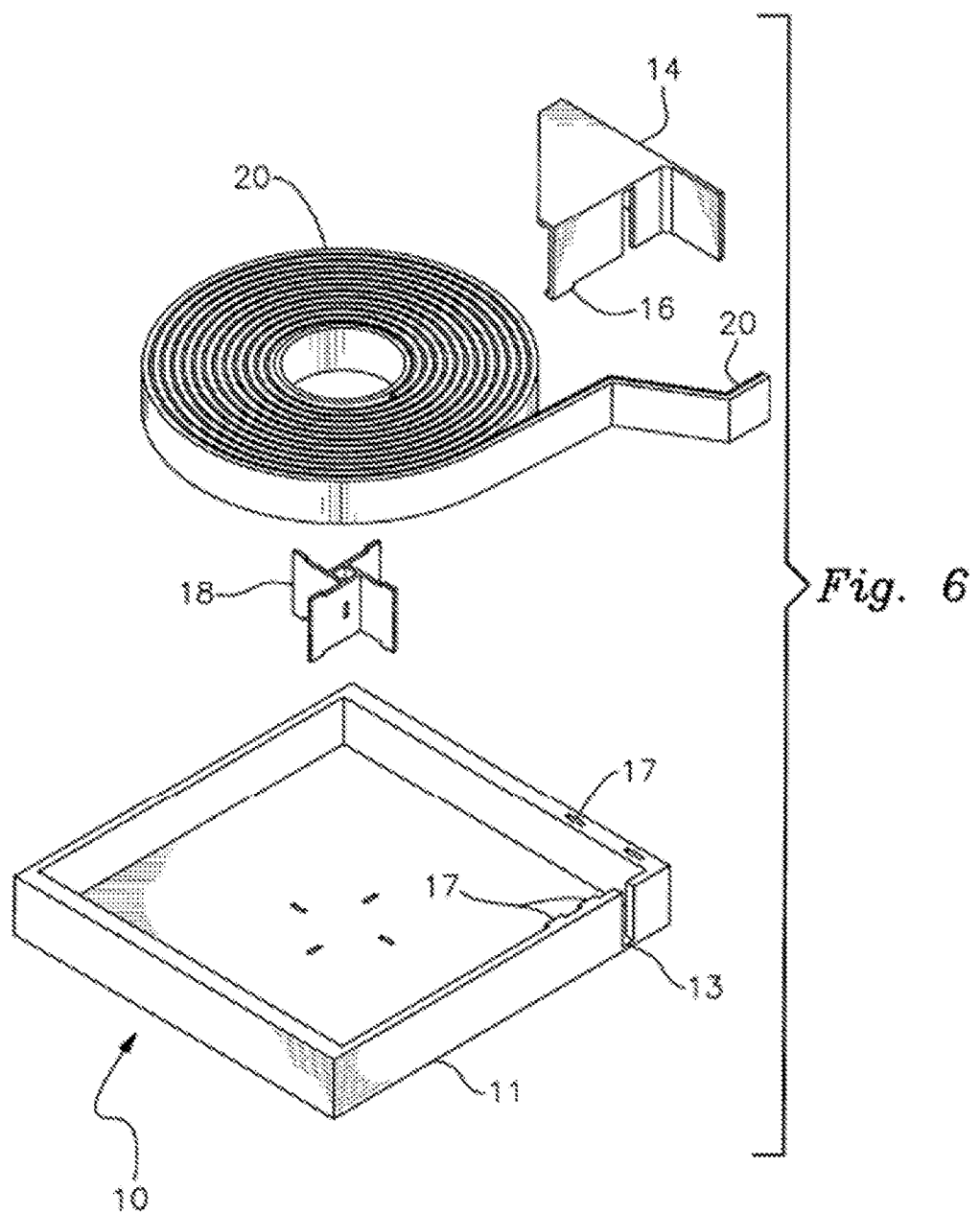
FIG. 6 is an exploded view of the cartridge dispenser of FIG. 4.

In a first embodiment of the dispenser cartridge shown in FIGS. 4-6, the semi-rigid wiper 14 is a separate member that is attached to the dispenser cartridge housing 11 by the operator. The wiper 14 and the cartridge housing 11 contain complimentary structural features to facilitate easy attachment. The wiper 14 is a corner piece formed to align with a corner of the cartridge housing 11. Further, the wiper 14 may be provided with tabs 16 or prongs which in the embodiment as shown align with pre-formed or pre-slit receiving slots or areas 17 of the cartridge housing 11. Alternatively, when the housing 11 is composed of a suitable material such as corrugated cardboard or a similar material, the tabs 16 are structured to be piercing members, and aligning the wiper 14 to the cartridge housing 11 is accomplished by pressing the two together causes the tabs 16 to pierce the housing 11 at the receiving areas 17. The tabs 16 are forced into the receiving areas 17 and achieve a suitable frictional engagement that is sufficient to retain the two components together until the dispenser cartridge 10 is emptied of its transfer tape 20, which is mounted onto a hub 18. When the cartridge 10 is emptied the wiper 14 is easily removed by the operator by reversing the relative motion applied to assemble the two and the wiper 14 is then re-used on another cartridge 10.

Figure 7:
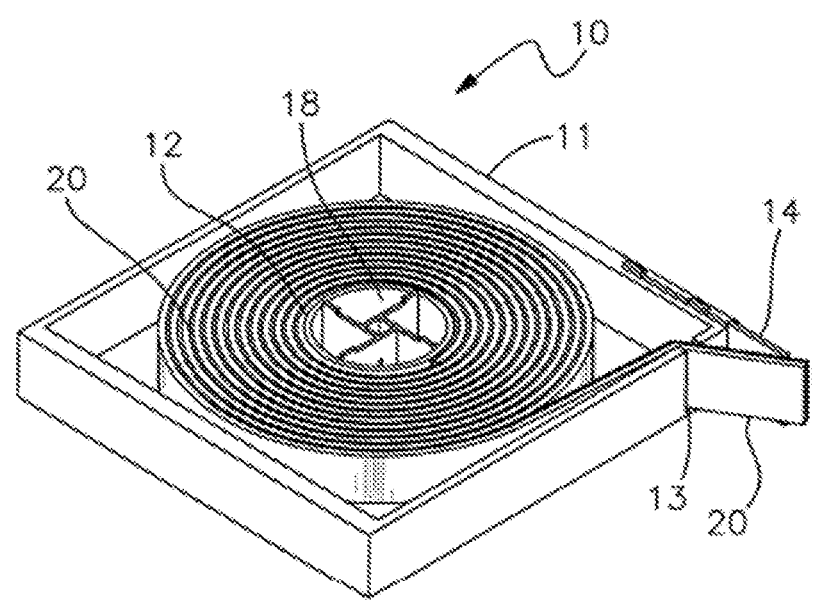
FIG. 7 is an exposed view of an alternative embodiment of the cartridge dispenser.
Figure 8:
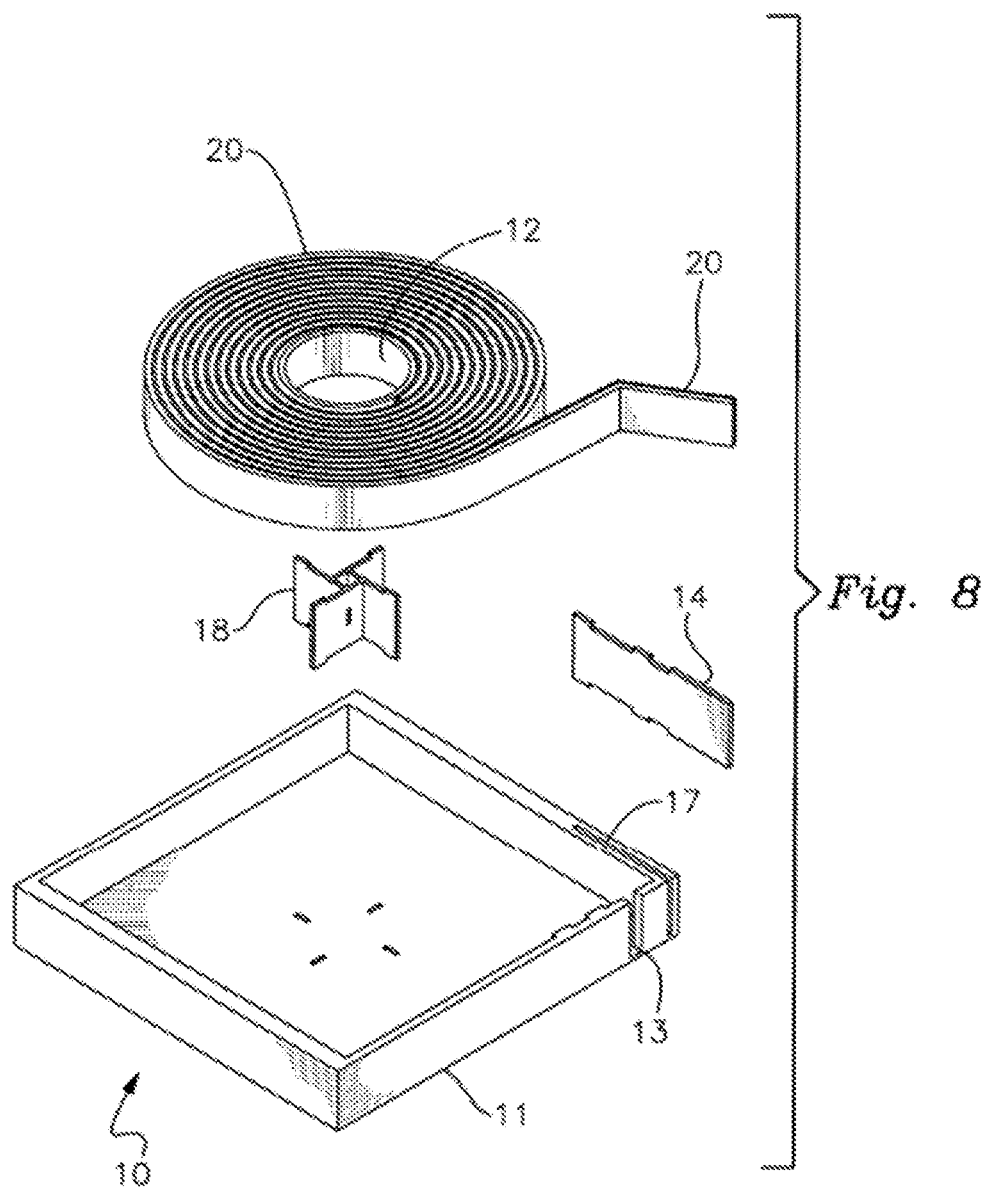
FIG. 8 is an exploded view of the cartridge dispenser of FIG. 7.

Another alternative embodiment is shown in FIGS. 7 and 8. In this embodiment the semi-rigid wiper 14 is an inexpensive, generally planar member that may be preinstalled with the completed dispenser cartridge 10 or later inserted by the operator into a tab receiving slot or areas 17. This simple blade wiper 14 and housing 11 have complementary features to engage and securely retain the wiper 14 through its use.

The dispenser cartridge 10 may contain features to retain the enclosed roll of transfer tape 20 such that the unwound portion of tape 20 protruding through the exit slot 13 does not retract back through the exit slot 13 into the housing 11, making it inaccessible to the operator. These features may consist of a centering device or hub 18 to hold the roll essentially in place inside the enclosure, but allowing the tape 20 to unwind as needed for proper dispensing. This hub 18 could be constructed to allow one-way rotation of the tape roll 20, that is in the unwinding direction, but not allow rotation of the tape roll 20 such that it would retract the protruding tape portion back into the housing 11. Further features may include a means to hold or retain the unwound portion of the tape 20 such as a surface to adhere a short portion of the exposed PSA 32A as is commonly done in well-known tape dispensers. Such features as described may be used in any combination.

In addition to being manually pulled from the dispenser cartridge 10, the cartridge may be motorized or otherwise powered to rotate the transfer tape spool 12, or guide rolls or drive rolls may be utilized to expel the transfer tape 20 from the cartridge 10 as needed. The dispenser cartridge 10 may be a stand-alone assembly such that the operator manipulates the dispenser cartridge 10 along the empty web spool by hand, or the dispenser cartridge 10 may be adapted for use within a secondary external housing, or for use in dispensing equipment or apparatus, whether fixed, moving or handheld. The dispenser cartridge 10 may be designed, structured and adapted to be a replaceable assembly removed from a secondary external unit, equipment or the like when empty, with a full cartridge 10 then inserted in its place.

Transfer Tapes with Cord Elements

In some embodiments, the transfer tape may further include features formed by cord or cord like elements. A cord may be a woven, braided, or twisted collection of fibers that may be flexible and movable much like the transfer tape substrate. In other examples, a cord may be a single fiber element that has properties much like a woven, braided or twisted collection of fibers. In preferred embodiments, the cord or cord like elements may be formed of materials that are re-pulpable or that may dissolve upon a processing to repulp waste material including the transfer tapes. Cords may be formed of paper, paper fibers, or similar material. The incorporation of cords or cord like elements may impart a number of characteristics to the transfer tape including stiffening the tape, interconnecting the tape, and importantly it may give an attached transfer tape a profile thickened in the portion of the tape connected to the cord.

Figure 9:
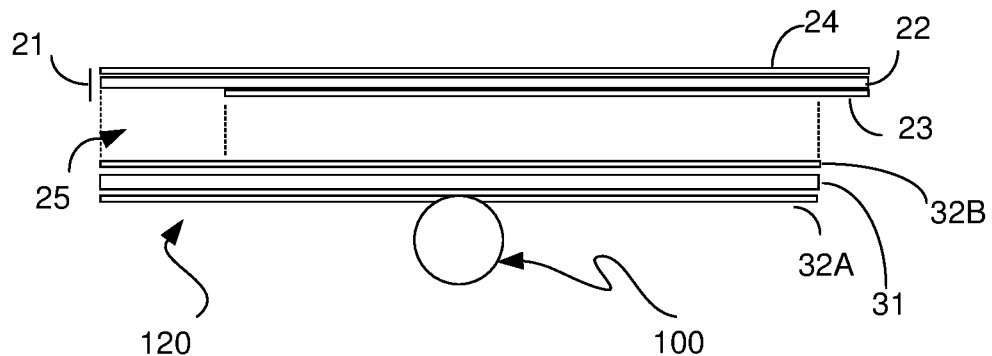
FIG. 9 illustrates an exploded end view of an embodiment of transfer tape with an incorporated cord.
Figure 10:
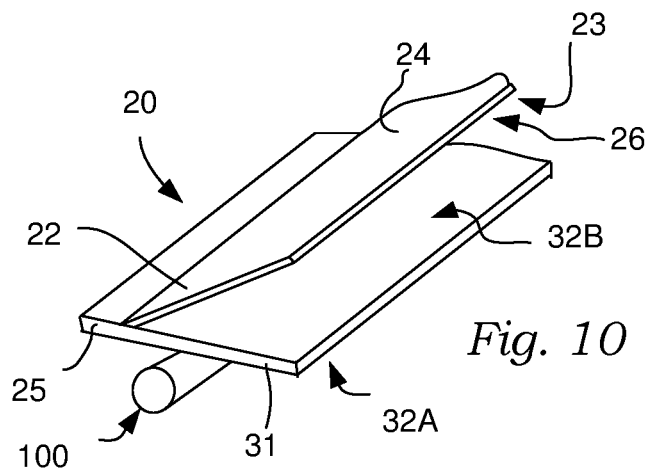
FIG. 10 illustrates a perspective illustration of the embodiment of FIG. 9 shown with the transfer tape assembled and with the cover flap partially open and with the incorporated cord thereunder.
Figure 11:
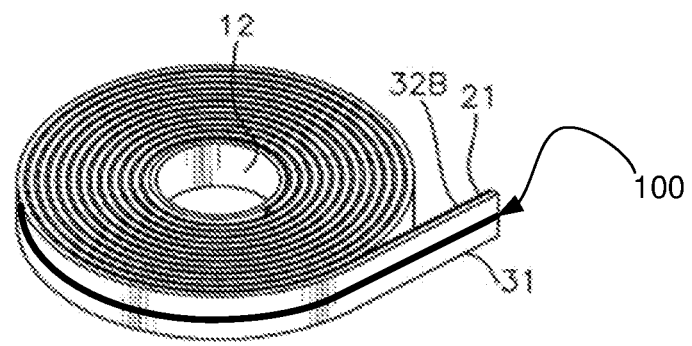
FIG. 11 illustrates a properly wound transfer tape having the tape substrate on the outside and the release liner on the inside to address buckling problems.

Referring to FIG. 9, an exemplary transfer tape 120 with a cord element 100, an embodiment of which is shown in FIGS. 9, 10 and 11, is a laminated composite of a transfer tape base or substrate 31 and a zone-coated release liner member 21. The transfer tape substrate 31 may be composed of a paper stock member (or a member composed of similar, suitable material, most preferably re-pulpable) of sufficient strength, thickness, texture and stiffness to accomplish the turn-up transfer operation without breaking or separating throughout its subsequent use. In some examples, a thin tissue like paper may be used as a substrate. Both sides of the transfer tape substrate 31 may be coated, layered or laminated with an adhesive, preferably a pressure sensitive adhesive (PSA) 32, suitable for attaching one side (the mounting side) of the laminated transfer tape 120 to an empty paper web spool and the other side (the web side) to a paper web of tissue or the like. The PSA 32A on the mounting side may have different properties compared to the PSA 32B on the web grabbing side. These different properties may include adhesion, tackiness, color, or thickness, among others. A cord 100 may be placed upon the PSA 32A. In some examples, the cord 100 may be centered upon the transfer tape substrate 31. In other examples, it may be placed at a non-centered location.

In the example of the illustration of FIG. 9, the cord 100 may be adhered with the PSA 32B and the cord itself may not be coated with any adhesive (in other embodiments the cord may be partially or entirely coated with an adhesive). It may function to provide a spacing or surface topography/profile of the tape upon the empty web spool. The profile may create a pressure when the empty web spool interacts with a paper web.

Continuing with FIGS. 9 and 10, the release liner member 21 may comprise a release liner substrate 22, preferably composed of a re-pulpable material, that is fully coated on its exposed side with a release layer or coating 24 composed of a material, such as silicone, that has very low adhesion to the PSA 32. With this coating, the mounting side PSA 32A will not adhere to the release liner substrate 22 when the transfer tape 120 is wound onto the transfer tape spool 12 of the dispenser cartridge 10, as the winding places the mounting side PSA 32A in contact with the release layer or coating 24. The opposite or interior side of the release liner substrate 22 is zone-coated with a suitably chosen release layer or coating 23 that prevents adhesion of the web grabbing PSA 32B to the release liner substrate 22. This non-adhering portion of the release liner substrate 22 defines the cover flap 26 which temporarily covers and then opens to expose the web grabbing PSA 32B during the turn-up operation as explained. And, as previously mentioned an underlying cord may raise portions of the web grabbing PSA 32B coated surface. The elements of the illustrated transfer tape 20 with attached cord 100 may be configured in the various manners as have been described herein.

Referring now to FIG. 11, the elements of the illustrated transfer tape 120 may be properly wound into a coil, having the tape substrate on the outside and the release liner on the inside to address buckling problems as previously discussed. The cord, attached to the tape substrate may, accordingly, be wound into the coil interacting with the release surfaces of the release liner member 21 of the underlying wound transfer tape.

Figure 12:
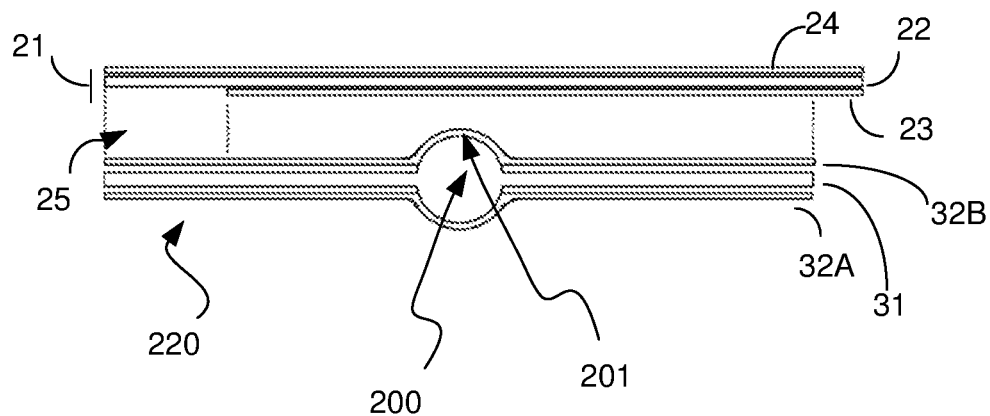
FIG. 12 illustrates an exploded end view of an alternative embodiment of transfer tape with an incorporated cord.

A transfer tape 220 may have a cord or cord like feature incorporated in different manners. As illustrated in FIG. 12, in some examples, the cord 200 or cord like feature may be embedded or incorporated into the transfer tape substrate 31. For example, a paper cord, formed of braided and wrapped paper strands, may be pressed into a paper pulp during the formation of the paper transfer tape substrate 31. In other examples, the substrate may be formed of alternative materials where a protruding surface of the cord like element may be formed directly into the transfer tape substrate 31. As mentioned, the paper transfer tape substrate, in preferred examples, may be re-pulpable or it may be dissolvable when spare material waste, such as at the end of a spool, is recycled. In examples where the transfer tape substrate 31 is formed directly with a cord like feature, the shape may be different from the illustrated round feature, such as with a hemispherical shape protruding on one surface only. The cord 200 or cord-like feature may be coated with PSA 201.

Figure 13:
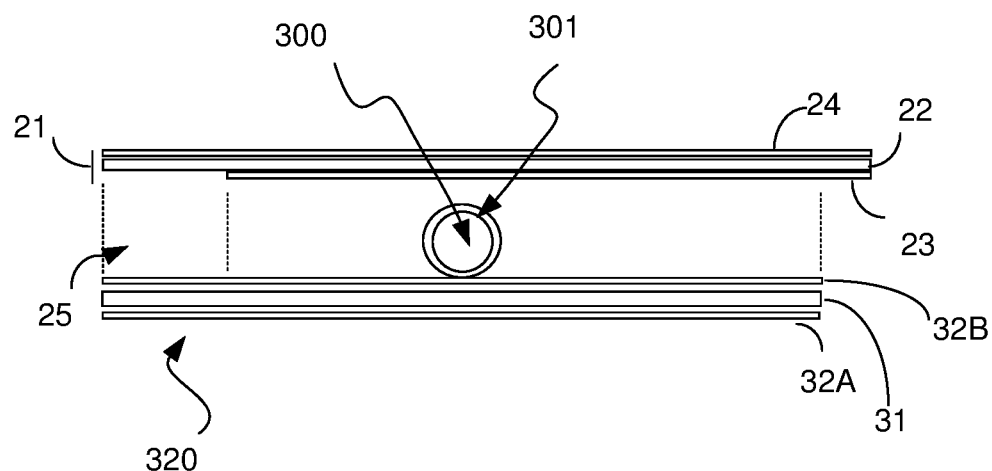
FIG. 13 illustrates an exploded end view of an alternative embodiment of transfer tape with an incorporated cord.

Proceeding to FIG. 13, a transfer tape 320, may be assembled with a cord 300 or cord like feature on the opposite side of the of the transfer tape substrate 31. If the cord 300 is on the opposite side, it may face up towards a paper web during turn-up. Accordingly, in some examples, the cord 300 or cord-like feature may be, itself, coated with pressure sensitive adhesive 301. It may be the same PSA as the PSA32B on the web grabbing PSA surface in some examples. The release liner member 21 may be dimensioned to accommodate the additional surface area due to the cord 300, and in some examples, the release liner may have a bent shape when assembled into the transfer tape 320.

What is claimed is:

1. A combination of a transfer tape cartridge dispenser and a paper web transfer tape with a cord;
    said dispenser comprising a transfer tape spool within a housing, said transfer tape being wound onto said transfer tape spool, said housing having a slot adapted such that said transfer tape passes through said slot as it is unwound;
    said transfer tape adapted to sever and secure a paper web from a first web spool onto an empty web spool in a web turn-up operation, said transfer tape comprising a tape substrate coated on one side with a web grabbing adhesive and on the other side with a mounting adhesive, and a release liner having a release liner substrate fully coated on a first side with a release layer and zone-coated on a second side with a release layer, said release layer being of a material that prevents adhesion of the adhesive to the release liner substrate, and a cord affixed to the tape substrate;
    said zone-coated release layer defining a longitudinally extending uncoated joining region on said release liner substrate, whereby said web grabbing adhesive adheres to the said uncoated joining region of said release liner substrate such that said zone-coated release layer defines a cover flap not adhered to said web grabbing adhesive;
    said transfer tape and the cord being wound onto said transfer tape spool with said release liner facing inward and said mounting side adhesive facing outward, such that said release layer fully coated on said first side of said release liner substrate prevents adhesion of said mounting side adhesive to said release liner substrate;
    said dispenser further comprising a wiper mounted on said housing adjacent said slot, said wiper adapted to apply pressure to said transfer tape when said transfer tape is applied to said empty paper web spool.

2. The combination of claim 1, wherein said mounting adhesive is a pressure sensitive adhesive.

3. The combination of claim 1, wherein said uncoated joining region of said release liner substrate extends along a longitudinal edge of said release liner substrate.

4. The combination of claim 1, wherein the cord comprises a re-pulpable material.

5. The combination of claim 4, wherein the re-pulpable material is paper.

6. The combination of claim 1, wherein said wiper is permanently mounted onto said housing.

7. The combination of claim 1, wherein said wiper is removably mounted onto said housing such that said wiper is reusable with other said dispenser cartridges.

8. The combination of claim 1, wherein the cord is affixed to the tape substrate on the mounting adhesive.

9. The combination of claim 1, wherein the cord is incorporated into the tape substrate during the formation of the tape substrate.

10. The combination of claim 1, wherein the cord is affixed to the tape substrate on the web grabbing adhesive, wherein the cord is coated with pressure sensitive adhesive.

11. The combination of claim 1, wherein said housing comprises at least one rectangular corner and said wiper comprises a corner piece aligned with said at least one rectangular corner.

12. The combination of claim 11, wherein said housing further comprises receiving slots and said wiper further comprises tabs aligned with said receiving slots.

13. The combination of claim 12, wherein said wiper tabs are piercing members.

14. The combination of claim 7, wherein said housing comprises at least one rectangular corner and said wiper comprises a corner piece aligned with said at least one rectangular corner.

15. The combination of claim 14, wherein said housing further comprises receiving slots and said wiper further comprises tabs aligned with said receiving slots.

16. The combination of claim 15, wherein said wiper tabs are piercing members.

17. The combination of claim 1, wherein said housing comprises a tab receiving slot and said wiper is a planar member inserted into said tab receiving slot.

18. The combination of claim 7, wherein said housing comprises a tab receiving slot and said wiper is a planar member inserted into said tab receiving slot.

19. A transfer tape for performing a paper web turn-up operation, the transfer tape comprising:
    a tape substrate coated on one side with a web grabbing adhesive and on the other side with a mounting adhesive;
    a release liner having a release liner substrate fully coated on a first side with a first release layer and zone-coated on a second side with a second release layer, said first release layer and second release layer being of a material that prevents adhesion of the adhesive to the release liner substrate;

a cord affixed to the tape substrate;

said zone-coated release layer defining a longitudinally extending uncoated joining region on said release liner substrate, whereby said web grabbing adhesive adheres to the said uncoated joining region of said release liner substrate such that said zone-coated release layer defines a cover flap not adhered to said web grabbing adhesive; and said cord defining an elevated surface profile of the transfer tape proximate to the cord when the transfer tape is adhered to a surface.

20. The transfer tape of claim 19, wherein the cord comprises re-pulpable material.

\* \* \* \* \*